Patented Nov. 15, 1938

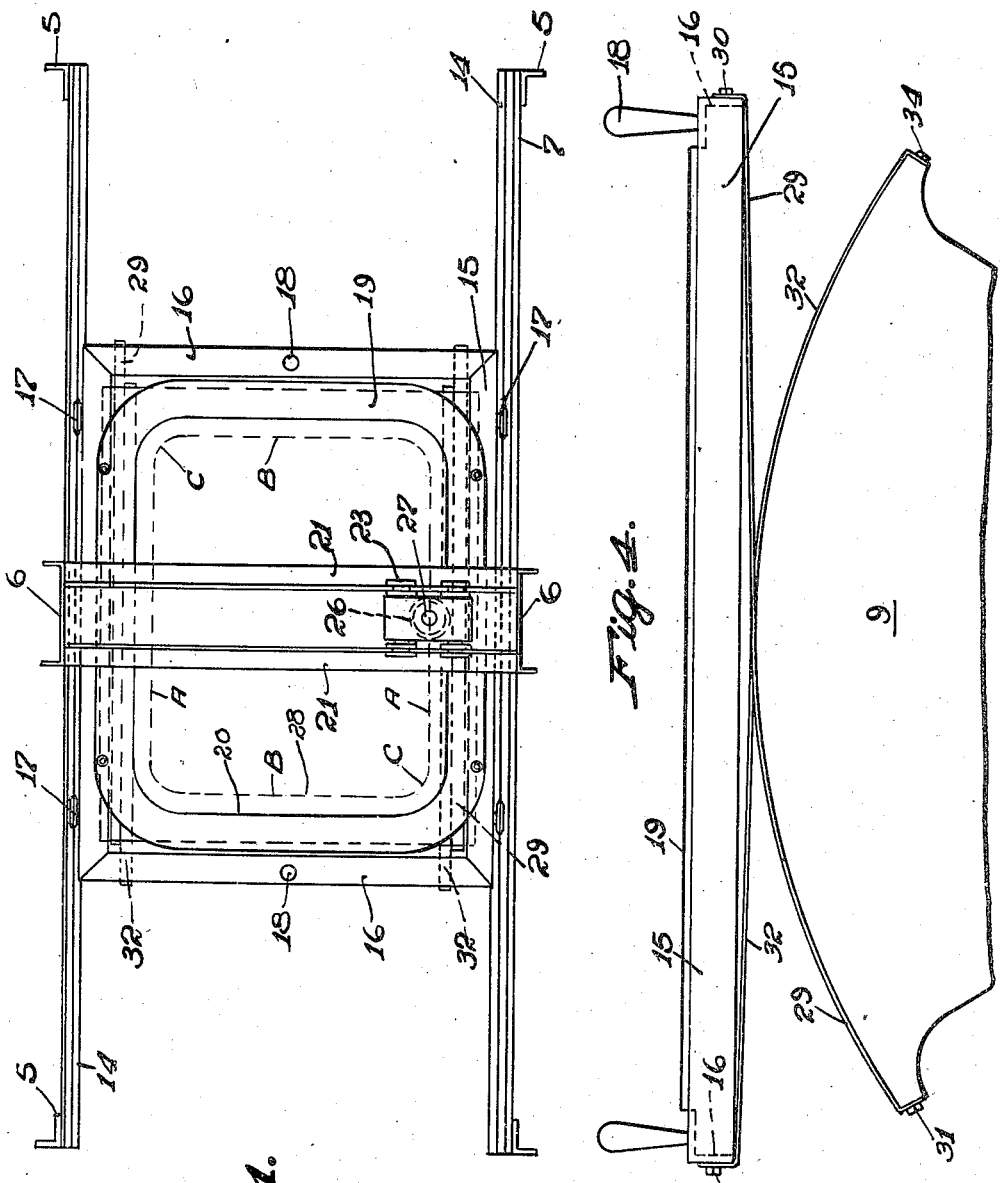

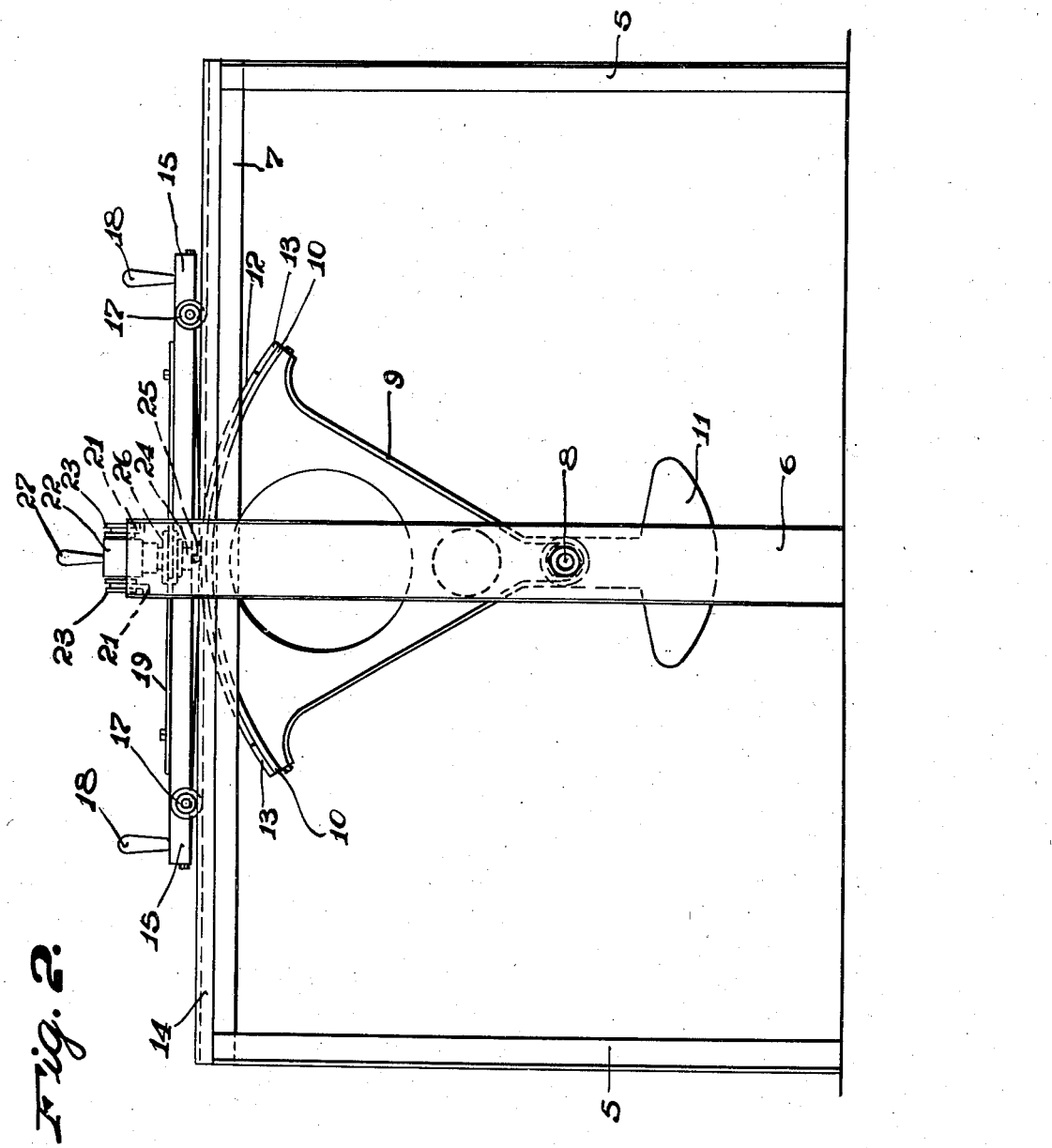

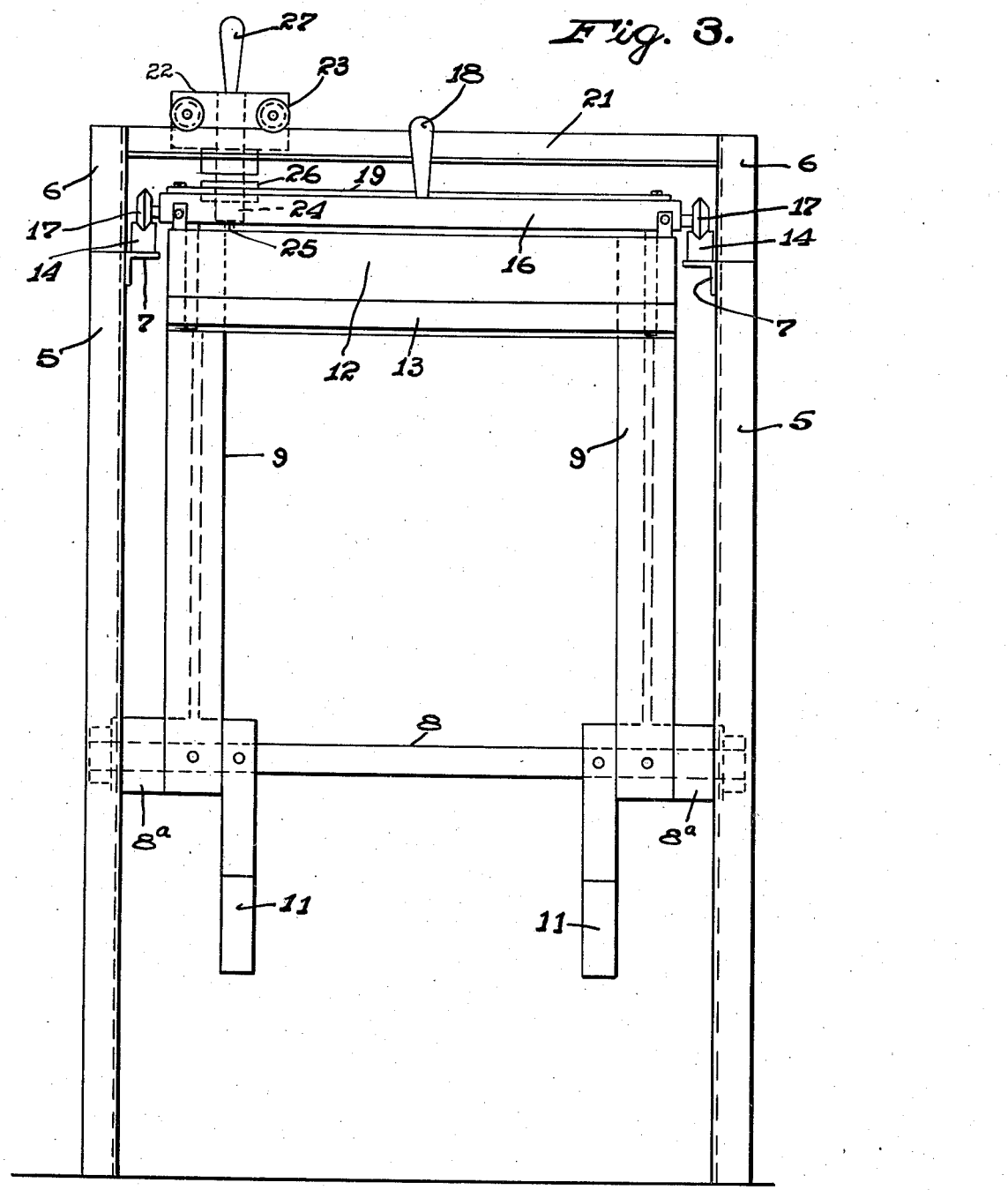

2,137,112

UNITED STATES PATENT OFFICE 2,137,112

APPARATUS FOR CUTTING CURVED GLASS SHEETS

Alfred L. Harrington, Rosslyn Farms, Pa., assignor to Pittsburgh Plate Glass Company, Allegheny County, Pa., a corporation of Pennsylvania Application February 15, 1938, Serial No. 190,621

4 Claims. (Cl. 33—21)

The invention relates to an apparatus for cutting curved glass sheets, and has for its objects the provision of an improved apparatus of simple construction, whereby the glass sheets may be cut in accordance with a templet expeditiously and with a minimum of breakage, and the provision of an apparatus which permits the use of a flat templet as a guide in scoring the sheet, as opposed to the curved templets heretofore required in cutting bent glass sheets. One embodiment of the invention is illustrated in the accompanying drawings, wherein:

Figure 1 is a plan view. Fig. 2 is a side elevation. Fig. 3 is an end elevation. And Fig. 4 is a partial side elevation showing a detail of construction.

Referring to the drawings, the framework of the machine comprises the four corner angles 5, 5, 5, 5, the upright channels 6, 6, and the two horizontal angles 7, 7, such parts being preferably secured together by welding. Mounted on a horizontal shaft 8, which is mounted in bearings 8a, 8a, carried by the channels 6, 6 is an oscillating table, such table comprising the side castings 9, 9 and the top plate 10, the latter being curved to the contour of the glass sheet which is to be cut. Carried on the shaft 8 is a counterweight 11, which normally holds the table in the position shown in Fig. 2. The glass sheet 12, which is to be cut, is secured to the top of the table 10 in any suitable manner, being preferably held against sliding movement by strips 13 at the edges of the sheet.

The horizontal angles 7, 7 act as a support for a track made up of the rails 14, 14, on which the templet carriage rides. This templet carriage is formed in rectangular shape from four angles 15, 15 and 16, 16 secured together at the corners and provided with the wheels 17, which ride on the track. A handle 18 is provided at each end of the carriage for convenience in moving it. Bolted to the top of the frame is the templet, which is in the form of a band 19, bent to the rectangular form shown in Fig. 1 and having an inner edge 20, which constitutes the guide surface of the templet. Extending transversely of the templet and located above such templet is a cutter bridge formed of the angles 21, 21 welded at their ends to the upper ends of the upright channels 6, 6. Mounted on the bridge is the cutter carriage 22, such carriage being provided with four wheels 23, which ride on the vertical flanges of the angles 21, 21. This carriage is provided with a depending stem 24, which carries the scoring tool 25 at its lower end, suitable tensioning means being provided, but not shown, for giving the proper scoring pressure by the cutter on the glass sheet. The tool shown is a cutter wheel, but may be a diamond and is swivelled to turn on a vertical axis in a manner well known in the glass cutting art. The stem 24 has mounted thereon a grooved guide wheel 26 which engages the guide edge 20 of the templet. The carriage is provided with a handle 27 for convenience in moving it.

The templet is so formed that with the guide wheel 26 engaging the edge 20 of such templet, the contour cut from the glass sheet will be the one desired when the parts are so manipulated that the wheel 26 follows the guide edge 20 around the circuit of the templet. As shown in Fig. 1, the dotted line 28 indicates the line of cut made on the glass sheet by the scoring tool when the operation, as above described, is carried out. In order to make the side scores A, A, in the cutting operation, the table carrying the glass sheet must be oscillated on the shaft 8, while in making the transverse scores B, B, the cutter carriage must be moved longitudinally of its bridge. The curved corner portions C of the scored line are made by a combination of the movements of the glass supporting table and of the cutter carriage. These movements require that the table carrying the glass sheet and the templet carriage move together, since the templet must move in synchronism with the movement of the glass sheet.

The means for causing the table and templet carriage to move together will be seen by reference to Fig. 4. The movement of the table to the right, when the carriage is moved to the right, is accomplished by a pair of flexible metal bands 29, one on each side of the table (Fig. 1) secured at one end to the carriage by the screws 30, and at the other end to the edge of the table by the screws 31. The movement of the table in the reverse direction, is similarly accomplished by a pair of bands 32 secured at one end to the carriage by the screws 33 and at their other end to the table by the screws 34. It will be apparent that as the carriage is moved in either direction, the table carrying the glass sheet is caused to move in the same direction at the same speed carrying the sheet beneath the scoring tool 25. In this manner one of the scores A is formed, and when the end of such score is reached, the operator continues the movement of the templet carriage and at the same time moves the cutter carriage inward so that by a combination of these two movements, the scoring tool forms the curved corner C. The templet carriage is now held in fixed position, and the carriage 22 is moved across the bridge to form the score B. When the next curved corner of the templet is reached, a combination of movements as above described, gives the necessary curved movement between the templet and table to give the cut C. After this, the cutter carriage is held in fixed position and the table and templet carriage are swung so as to carry the glass beneath the scoring tool and provide the next cut A. In operating the device, the workman grasps one of the handles 18 in one hand and the handle 27 with the other hand. The operation of scoring the glass to form the complete cut may with a little practice be carried out rapidly and accurately, it being necessary, of course, for the operator throughout the cutting movement to keep the guide wheel 26 in close engagement with the guide edge 20 of the templet.

It will be understood that the apparatus, as shown, is capable of considerable modification without departing from the broad features disclosed and comprehending the use of a flat templet movable horizontally with an oscillating curved table therebeneath and a transverse bridge on which cutter carriage is mounted. The means comprising the flexible bands for moving the table in synchronism with the templet carriage constitutes a simple and practical means for accomplishing this function, but it will be understood that various other devices might be accomplished for securing this related movement, the only requirement being that the curved table move back and forth with the templet carriage in properly timed relation. The apparatus may, by suitable changes, be adapted for cutting sheets whose curvature is not the same throughout or in which the curvature is other than an arc of a circle. In such case, provision must be made for moving the table about a shifting center of oscillation rather than around a fixed center as is done in the apparatus as illustrated. The only requirement is that the glass shall move beneath the cutter at a constant elevation so that the cutter does not have to move up and down in performing its scoring function.

What I claim is:

1. In apparatus for cutting a glass sheet bent to a given radius of curvature, a table for supporting the sheet having its face of the same radius of curvature as the sheet, a horizontal axis of rotation for the table at the center of said radius of curvature, a templet carriage mounted above the table for horizontal movement transversely of said axis of rotation, a flat horizontal templet secured to the carriage, connections between the table and carriage for oscillating the table with the back and forth movement of the carriage, a horizontal cutter bridge above the table in vertical alinement with said axis of rotation and parallel thereto, a cutter carriage mounted on the bridge for guided movement longitudinally thereof, a scoring tool on the cutter carriage for engaging the glass sheet, and means on the cutter carriage engaging the templet.

2. In apparatus for cutting a glass sheet bent to a given radius of curvature, a table for supporting the sheet having its face of the same radius of curvature as the sheet, a horizontal axis of rotation for the table at the center of said radius of curvature, a templet carriage mounted above the table for horizontal movement transversely of said axis of rotation, a flat horizontal templet secured to the carriage, flexible connections from the table to the ends of the templet carriage for oscillating the table with the back and forth movement of the carriage, a horizontal cutter bridge above the table in vertical alinement with said axis of rotation and parallel thereto, a cutter carriage mounted on the bridge for guided movement longitudinally thereof, a scoring tool on the cutter carriage for engaging the glass sheet, and means on the cutter carriage engaging the templet.

3. In apparatus for cutting a glass sheet bent to a given radius of curvature, a table for supporting the sheet having its face of the same radius of curvature as the sheet, a horizontal axis of rotation for the table at the center of said radius of curvature, a counterweight for the table below said axis of rotation tending to hold the center thereof in vertical alinement with such axis, a templet carriage mounted above the table for horizontal movement transversely of said axis of rotation, a flat horizontal templet secured to the carriage, connections between the table and carriage for oscillating the table with the back and forth movement of the carriage, a horizontal cutter bridge above the table in vertical alinement with said axis of rotation and parallel thereto, a cutter carriage mounted on the bridge for guided movement longitudinally thereof, a scoring tool on the cutter carriage for engaging the glass sheet, and means on the cutter carriage engaging the templet.

4. In apparatus for cutting a curved glass sheet, a table for supporting the sheet having its face of the same curvature as the sheet, a horizontal axis of rotation for the table, a templet carriage mounted above the table for horizontal movement transversely of said axis of rotation, a flat horizontal templet secured to the carriage, connecting means between the table and carriage for oscillating the table with the back and forth movement of the carriage at the same rate of movement, a horizontal cutter bridge above the highest point of the table at right angles to the line of movement thereof, a cutter carriage mounted on the bridge for guided movement longitudinally thereof, a scoring tool on the cutter carriage for engaging the glass sheet, and means on the cutter carriage engaging the templet.

ALFRED L. HARRINGTON.